United States Patent [19]
Nollet

[11] 4,070,202
[45] Jan. 24, 1978

[54] METHOD AND APPARATUS FOR SEPARATING SOLID MATERIALS

[75] Inventor: Anthony R. Nollet, Wilmington, Del.

[73] Assignee: Cargill, Incorporated, Minneapolis, Minn.

[21] Appl. No.: 669,831

[22] Filed: Mar. 24, 1976

[51] Int. Cl.$^2$ .................. B02C 19/00; B07B 15/00
[52] U.S. Cl. .................. 106/309; 209/11; 209/473; 209/482; 241/79.1; 241/19; 241/24
[58] Field of Search .............. 106/309; 209/473, 482, 209/11; 241/79.1, 19, 24

[56] References Cited
U.S. PATENT DOCUMENTS

| | | | |
|---|---|---|---|
| 3,804,249 | 4/1974 | Gibbons | 209/473 |
| 3,836,085 | 9/1974 | Brown | 241/19 |
| 3,848,813 | 11/1974 | Stanczyk et al. | 241/19 |
| 3,925,198 | 12/1975 | Eckhoff et al. | 209/3 |
| 3,966,129 | 6/1976 | Brewer | 241/79.1 |
| 3,973,739 | 9/1976 | Nilsson | 209/39 |

*Primary Examiner*—Winston A. Douglas
*Assistant Examiner*—J. V. Howard
*Attorney, Agent, or Firm*—Fitch, Even, Tabin & Luedeka

[57] ABSTRACT

A rotary drum air separation system separates mixed solid materials into a light fraction and a heavy fraction with substantially no stagnation of material in the air drum. It further provides for processing high volume urban solid waste without first size reducing the waste. The system separates such waste into a light fraction, substantially free of glass and ready for composting or for use as a source of energy in the form of heat or combustible gas from pyrolysis, a heavy fraction, and a glass-rich fraction from the heavy fraction, all in a high volume operation.

18 Claims, 10 Drawing Figures

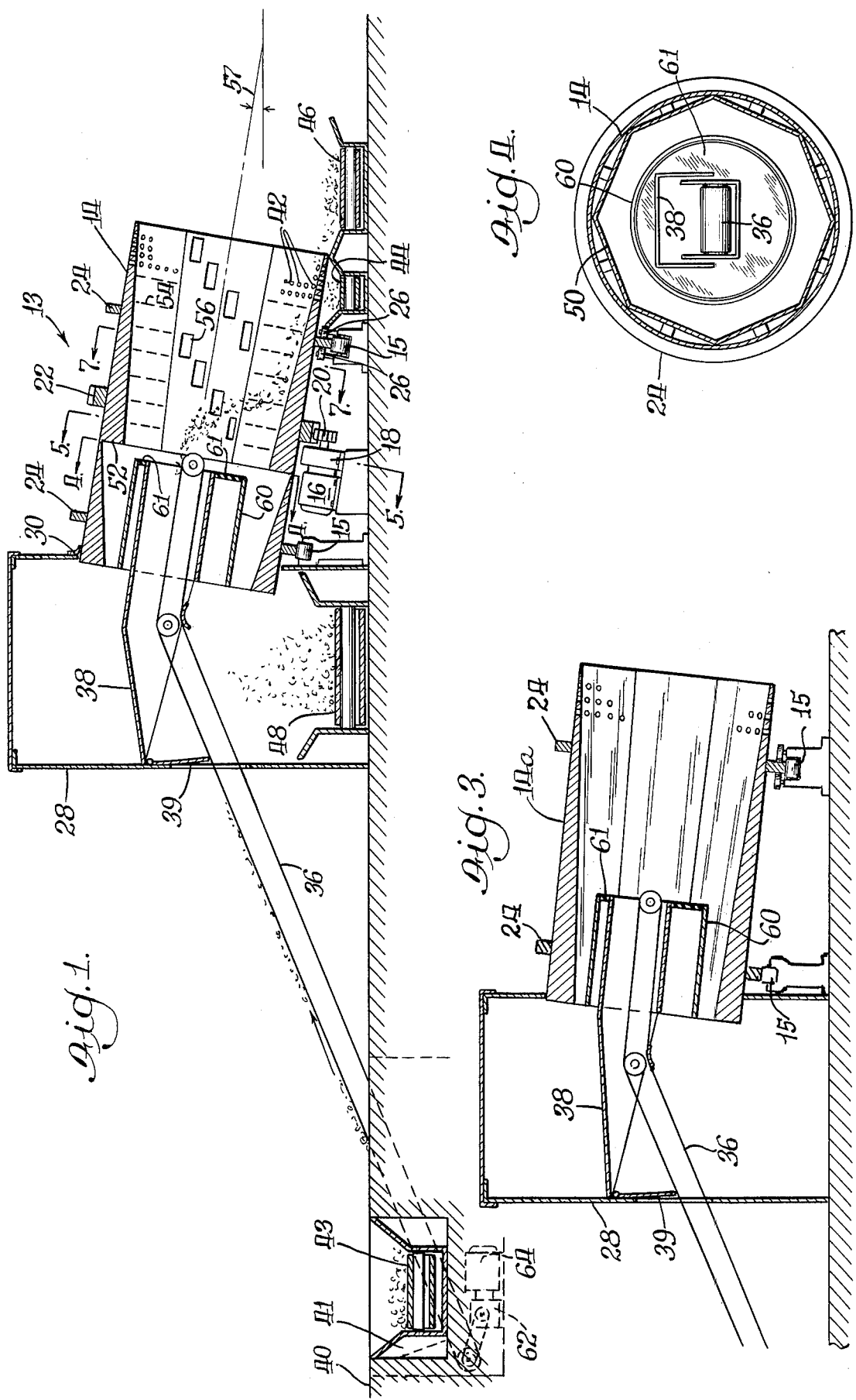

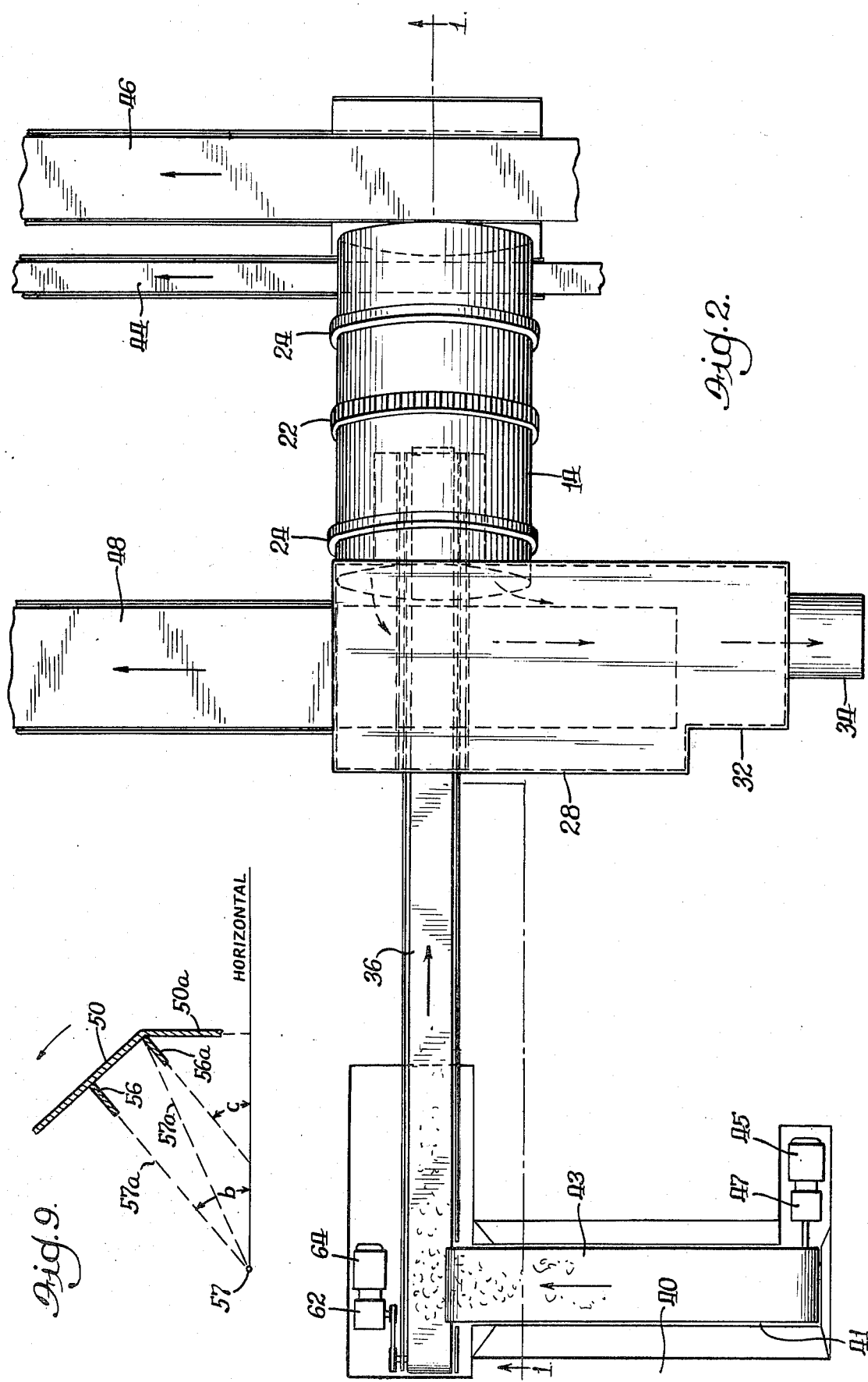

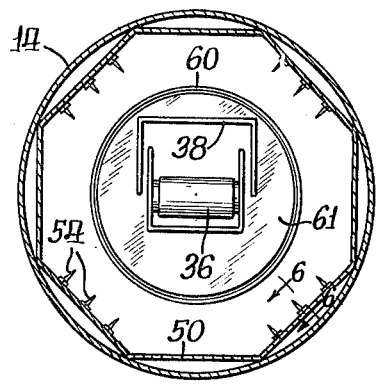
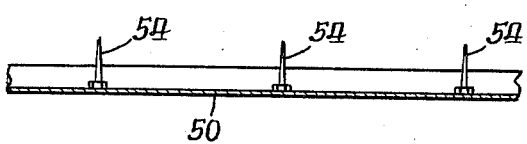
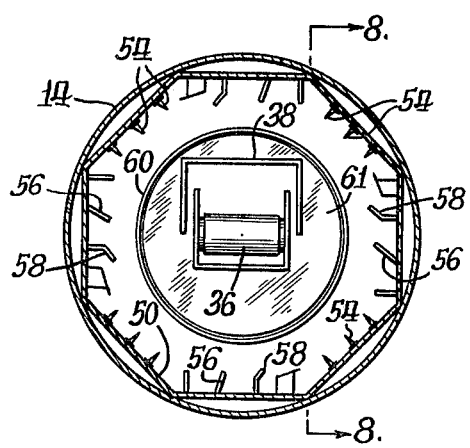
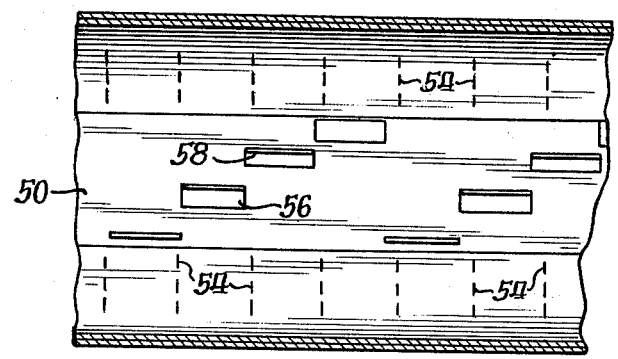
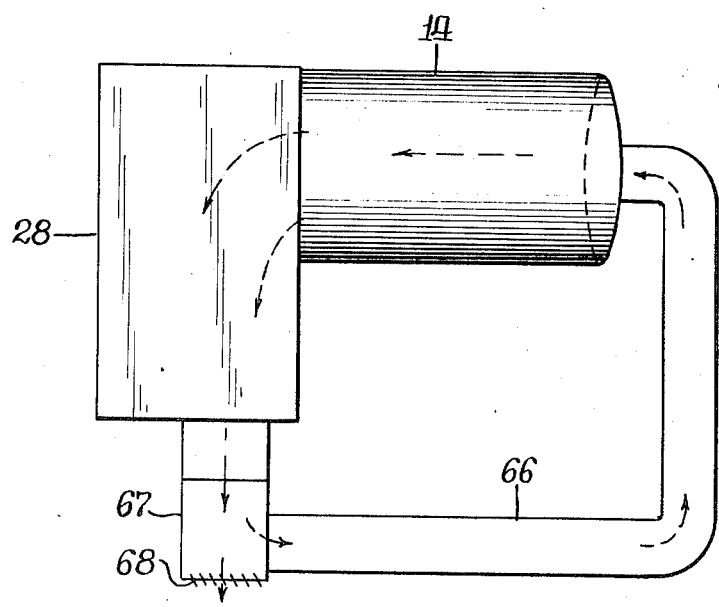

METHOD AND APPARATUS FOR SEPARATING SOLID MATERIALS

This invention relates to the processing of refuse and more particularly to a method and apparatus for receiving and processing mixed solid and previously unshredded material, such as urban waste, with a view of reclaiming or otherwise gainfully utilizing the processed material.

It is generally known that the rapidly increasing volume of urban waste is a cause of public concern. Public sensitivity to the environment coupled with depletion of natural resources has brought the disposal of waste to the fore. An acceptable solution to the problem of handling the increasing volume of urban waste lies in the reclamation and gainful use of this material.

As used herein, the term "refuse" refers generally to solid waste materials, and the term "urban waste" refers generally to all solid waste generated in an urban area, which may include at any one time a mixture of such matter as bulky waste, industrial waste, commercial waste, construction waste, and residential and yard waste. This matter is collected and brought to disposal centers by municipal trucks, commercial scavengers and private carriers. Thus, refuse at urban collection centers consists of more than ordinary household trash and garbage, and the extreme heterogeneous nature of urban waste presents many difficulties to implementing a reclamation system on a bulk scale. For example, it is not unusual to find such things as auto engines, transmissions, tree stumps, packages of dynamite and other explosives, steel I-beams, truck rear ends, and manhole covers in the mixture of refuse in addition to such usual items as assorted glass, metal objects, papers, plastics, cardboard, magazines, rags, leaves and garbage.

Typical known reclamation systems begin by shredding or otherwise reducing the size of incoming solid waste. Such initial shredding in view of the aforementioned things often found in urban waste, has many disadvantages. For example, many of the aforementioned things cannot be shredded in a hammer mill or other type of shredder. Additionally, a device which is efficient for shredding metal and heavy fraction objects may be very inefficient for shredding bulky items such as paper, plastic and the like. Further, shredders have moving parts, such as hammers, that typically strike the incoming material with velocities well in excess of 50 feet per second. It has been reported that an impact velocity exceeding 50 feet per second generally is sufficient to detonate dynamite and certain other explosives. When such explosives are hidden in the incoming waste stream by paper, rags, cardboard and other material having low specific gravity, they usually go undetected and expose the system to unwanted explosions, causing severe damage to property and possible loss of life.

Moreover, hammer mills generally fracture glass and ceramics into small particles. When the shredded product is subsequently separated or classified by air, the small glass and ceramic particles behave as light particles and tend to move in the air stream with other light materials. Additionally, the act of shredding embeds fine particles of glass into paper, cardboard, and other materials which go to light fraction. Where it is contemplated to use such light materials as fuel or compost, the inclusion of glass and ceramic particles in the light materials is undesirable. Thus, systems employing shredding as a first step do not provide a clean light fraction out of a subsequent air classifying step. Additionally, glass tends to erode the wearing parts of hammer mills and other shredders.

Other disadvantages of initial shredding in processing refuse is apparent. If the divided out light fraction is wet, it is difficult to store and handle, whereas light fraction separated from initially unshredded waste material is easy to store, and in some instances can be used as fuel in the "as is" condition, thus eliminating the need to shred the material at any time. Also, light fraction can be pyrolyzed "as is" or in large particle form in conventional pyrolyzing units (furnaces) to produce a combustible gas. Otherwise, the shredding process can be done by a relatively inexpensive shredder that need only have the capability of handling light, easily shreddable material, and the process can be located close to the device in which the light fraction material will be burned or pyrolyzed. Also, if the separated light fraction is to be composed, it is neither necessary nor desirable to shred the material before composting it. In composting, the aerobic bacteria will decompose the biodegradable portion of the light fraction, leaving the non-biodegradable portion, such as plastics and rubber, unaffected. If the composting process begins with unshredded light fraction material, the aerobic bacteria decompose the biodegradable portion into very small particles, and the particle size of the non-biodegradable material is not affected. Because of a resulting relatively large size differential between these two portions, a screening step may then be used to separate the composted biodegradable portion from the non-biodegradable portion. On the other hand, such large size differential between particles is not achieved if the material is shredded prior to its being segregated and/or composted.

In the known systems that utilize rotating air drum classifiers, there is a tendency for certain materials to stagnate in the drum, i.e., material having a critical velocity equal to the air velocity fails to be moved to either end of the drum for exiting from the drum. As a consequence, such material builds up in certain locations within the drum and impedes the separation process. Such is detrimental to large, bulk operations where high tonnage of processing per hour is desirable.

U.S. Pat. No. 3,804,294, entitled "Air Drum Sorter For Solid Wastes", issued Apr. 16, 1974 discloses apparatus for accepting commercial refuse after it has been processed by appropriate size reduction equipment, such as a chain mill or shredder before being dumped into the input of the apparatus, the purpose of such size reduction treatment being to break up bagged trash and relatively large objects such as gallon glass jugs and cardboard boxes. Other prior art dry systems also disclose this initial size reduction system in order to effectively deal with vast quantities of bulky and diverse items in heterogeneous refuse.

This initial size reduction is an expensive and time-consuming operation. It also results in fines of glass and other materials which can become airborne or can be physically embedded in the light fraction material.

There is a particular need for a large scale efficient classifying system which is capable of handling refuse at a high volume rate.

It is, therefore, a principal object of this invention to provide an improved system for separating previously unshredded mixed solid materials into a heavy fraction and a light fraction for subsequent gainful use of each constituent material group.

Other objects of the invention will become apparent and the invention readily understood from the following description read in connection with the accompanying drawings in which:

FIG. 1 is a schematic side view in section taken substantially along the line 1—1 of FIG. 2 of apparatus constructed in accordance with the principles of this invention;

FIG. 2 is a plan view in schematic form of the apparatus represented in FIG. 1;

FIG. 3 is a side view in schematic form of a portion of the apparatus of FIG. 1 illustrating a structural variation of a part thereof;

FIG. 4 is a cross section of a portion of the apparatus taken along the line 4—4 of FIG. 1;

FIG. 5 is a cross section of a portion of the apparatus taken along the line 5—5 of FIG. 1;

FIG. 6 is a partial sectional view of a portion of the apparatus taken along the line 6—6 of FIG. 5;

FIG. 7 is a cross section of a portion of the apparatus taken along the line 7—7 of FIG. 1;

FIG. 8 is a partial longitudinal sectional view of the apparatus taken along the line 8—8 of FIG. 7;

FIG. 9 is an illustration depicting effects of various internal parts of the apparatus; and FIG. 10 is a plan view of a portion of the apparatus shown in FIG. 2 and illustrating an alternative construction thereof.

Briefly, in accordance with the invention, a rotating air drum processor is used to separate mixed solid material into a heavy fraction and a light fraction or to separate grain from impurities or to beneficiate minerals. Further, it is used to process unshredded and otherwise previously unprocessed urban waste in high volume. Such waste may be separated into a substantially combustible light fraction substantially free of glass and a substantially non-combustible heavy fraction from which may be further segregated a glass-rich fraction. To simplify the illustration and description of the invention, the processing of urban waste is described. It is not intended that the invention be limited to only such use, however, as it also has application to grain processing, mineral processing and the like where air classifying can be expediently utilized, especially in high volume applications.

Typically, urban refuse is a heterogeneous mixture of such matter as miscellaneous residential, commercial, industrial and construction waste and may include bulky and long materials, such as truck and auto engines, transmissions, rear ends, tree stumps, steel I-beams, appliances, furniture, animals and other such items. Further, the mixture may include hazardous items, such as dynamite, land mines, and other explosives.

The refuse is deposited on a receiving platform after being weighed in. Mobile apparatus moves the refuse from the receiving platform into a pit where a cross conveyor transfers the refuse in a controlled manner to an infeed conveyor, which moves the material from the receiving pit conveyor to the interior of a rotating air drum that has its rotational axis inclined with respect to the horizontal. The air drum is open at least at one end, and preferably the incoming waste material enters the drum through an open upper end. Although parts of the drum may have a cylindrical form on the outside, its inner surface preferably comprises a plurality of flat, side-by-side surfaces that together in cross section form the perimeter of a polygon. Such inner polygonal surface has, at least on portions thereof, inwardly directed elements mounted thereon. The polygonal surface and these elements are effective in tumbling the waste material as the drum rotates by lifting and dropping the material a sufficient number of times in an air stream flowing through the drum so as to generally separate the light fraction materials transportable by the air stream from the heavy fraction materials that otherwise defy the air stream. The invention is effective in substantially eliminating stagnation of any material, as will be seen hereinafter. The heavy fraction materials on each drop move down the inclined drum and eventually out the lower end into a receptacle, which may include a conveyor. Glass is generally broken up into segments during the dropping, and these glass segments follow the heavy fraction materials down the drum and find their way through a trommel located in the drum's surface next to its lower end and become separated from the remaining heavy fraction. The light fraction materials transported by the air stream are carried out the upper end of the drum into a plenum or similar structure where a greatly enlarged volume of the chamber causes a sudden reduced rate of air flow and a consequent dropping of the materials carried by the air. The air then passes through conventional gas or air cleaning devices (not shown), such as electrostatic precipitators, air scrubbers or cyclone cleaners, before being exhausted to the atmosphere. Both the glass-rich fraction and the light fraction also may be carried away by suitable conveyor means.

The materials, such as paper and rags, before processing form a deep burden on the receiving conveyor. Such burden conceals oversized objects and potentially dangerous or hazardous objects which are also concealed by their being delivered in bags. Consequently, manual inspection and removal of such objects is a difficult if not impossible task. In this invention, the velocities encountered in tumbling the incoming material are such that the impact velocities applied to the material are substantially below those which are likely to detonate dynamite and other explosives. Thus, the light fraction is separated from the glass-rich fraction and the heavy fraction so as to allow the heavy fraction to be relatively clean and easily inspected thereafter. An inspector looking for heavy matter that exits from the heavy fraction end of the rotating drum onto a conveyor can easily detect unusually large or potentially dangerous objects.

The light fraction after exiting from the light fraction end of the drum can be passed under an overhead magnetic separator to extract magnetic metals and thereafter be utilized as a source of fuel having a relatively high heating value and a relatively low ash content.

The inner surfaces of the rotating drum further include piercing elements to break up bags and packages or otherwise wrapped material. Also, the inner surfaces contain lifter shelves to assist the inner polygonal perimeter in lifting and tumbling the contents of the drum. The inside of the drum preferably is tapered to a smaller cross-sectional area at the top end than at the bottom so as to cause a gradually increasing air velocity to transport the light fraction to the upper, or light fraction, end of the drum.

Referring now to FIG. 1, there is shown a processor 13 that includes an air drum 14. This air drum is rotatably mounted and its axis of rotation is inclined with respect to the horizontal. The drum is open at both the upper and lower ends.

The drum 14 is mounted in a suitable manner for rotation about its axis on a plurality of trunnion rollers 15. For purposes of illustration, an electrical motor 16 or other power source drives a speed reducer 18 on the output of which is a pinion 20 that meshes with an axially spaced circumferential girth gear 22 secured to the exterior surface of the drum. The speed reducer 18 is preferably of the conventional variable speed type so as to allow for adjustment in the rotational velocity of the drum 14. At least the portion of the exterior surface of the drum containing the gear is circular. The drum also has a pair of axially spaced roller rings 24 that serve as bearing surfaces for the trunnion rollers 15. On either side of at least one of the rings 24 is a pair of thrust rollers 26 that limit thrust or longitudinal movements of the drum. This illustrated tangential driving mechanism at the periphery of the drum is only representative of a suitable driving means for the drum. Other forms may include flat belts, V-belts, cables, ropes and a chain with sprockets.

The upper end of the drum 14 extends through the wall of a large housing or plenum 28. A suitable seal 30, such as a flexible rubber element, is applied around the opening between the side wall of the plenum and the upper end of the drum to maintain a differential pressure between the inside of the plenum and the atmosphere while permitting rotation of the drum 14. As best seen in FIG. 2, the plenum structure carries an air moving means, such as a blower 32 driven by a motor 34. By means of the blower an air stream is created through the drum from its lower end to its upper end, through the plenum, through air cleaning devices (not shown) and out to the atmosphere. An alternative, as discussed in detail hereinafter, is to shunt some or all of the exhausted air back to the lower end of the drum 14 for recirculation through the drum.

Returning to FIG. 1, a suitable means, such as an infeed conveyor 36, is utilized to transport the unshredded and otherwise previously unprocessed urban waste material through the plenum 28 and into the interior of the drum 14. The portions of the infeed conveyor 36 that extend through the plenum 28 and into the drum 14 are carried in a housing 38. A flapper air seal 39, such as a rubber or other flexible material cover, allows passage of the conveyor through the wall of the housing while forming a substantially airtight seal. A receiving platform 40 accepts the incoming waste material from scavenger trucks and other conveyances after such are weighted on suitable scales (not shown). Suitable mechanical means (not shown) transfer the waste material from the receiving platform into a pit 41 in the bottom of which is a cross conveyor 43 that receives the waste material dumped into the pit and transports it to the lower end of the infeed conveyor 36. As best seen in FIG. 2, suitable means, such as a motor 45 and gear reducer 47, are provided to drive the cross conveyor 43. Preferably, the gear reducer is of the variable type to provide speed adjustments for controlled input of the refuse to the infeed conveyor 36. Thus, the charging rate of the refuse into the drum can be increased or decreased as desired.

Although the conveyor 36 could project into the drum 14 from the lower end of the drum where on-site configurations require such layout, for reasons to become apparent hereinafter, it is preferred that the infeed conveyor enter the drum through its upper end as illustrated.

Located in the drum surface next to the lower end of the drum 14 is a trommel or grating 42. The purpose of this grating 42 is to separate out a glass-rich aggregate from the heavy fraction of the waste material by allowing the same to pass through the grating while larger heavy fractional materials not accepted by the grating continue to pass over the grating. Preferably, the grating is such as to pass three-quarter inch material and extends circumferentially throughout the lower portion of the drum 14. A suitable receiving means, such as a conveyor 44, is located below the grating 42.

Suitable means, such as a conveyor 46, is located below the lower end of the drum 14 to receive the heavy fraction materials as they exit from the drum, and means, such as conveyor 48, is located on the bottom of the plenum 28 to receive the light fraction materials as they exit from the upper end of the drum.

Referring now to FIG. 4, it will be seen that although the outside of the drum 14 may be circular in certain cross sections, the inside takes on a different form. Preferably, the inside includes a plurality of flat panels 50 suitably supported in a side-by-side manner to form a polygonal cross section, preferably having an even number of sides. A polygon with an uneven number of sides is undesirable in a rotating drum because of problems with dynamic balance. Although eight panels 50 are shown, it should be understood that such is for purposes of illustration only, and it is not intended to limit the invention to a drum having only an octagonal cross section internally. An unexpected result of using a polygonal cross section for the interior of the drum 14, as opposed to a circular cross section, is that the sides act to lift and tumble the light material while very heavy particles impacting on one of the sides tend to slide at relatively high velocity down the drum toward the lower end when the side is rotated away from the horizontal. This concept of the sides acting as lifters is further described hereinafter.

Referring again to FIG. 1, in accordance with the invention, an ever-increasing air velocity is effected from the lower end of the drum to the upper end to materially reduce the tendency of particles to stagnate in the drum, i.e., for the drum to become saturated with material that does not move either longitudinally up or down the drum in the air stream. Airborne particles behave in a moving air stream in accordance with their area to mass ratio, aerodynamic shape, and the consequent force exerted on them by the air stream. Each particle may be said to have a critical velocity, which is that gas velocity that, if exceeded, will move a particle in the direction of a gas stream. In an inclined rotating drum, if the gas velocity is less than the critical velocity of a given particle, the particle tends to move in a direction counter to the gas stream. As indicated herein, the drum 14 has its rotational axis inclined at an angle to the horizontal. The air flow stream is parallel to the longitudinal axis and upwardly of the inclined drum, and so when a heavy particle is falling under force of gravity in the drum, the end result is that the component of weight of the particle tends to move the particle down the drum in opposition to the air stream. When, on the other hand, the velocity of the air stream exceeds the critical velocity of the particle, the sum of the forces acting on the particle moves it longitudinally upwardly of the drum.

In accordance with the invention, a light particle is continuously accelerated in the direction of its initial movement generally paralleling the rotational axis by the ever-increasing air velocity that occurs from the lower end of the drum 14 to the upper end. A heavy particle is less influenced by the air flow as the particle moves down the drum because of the ever-decreasing air velocity that occurs from the upper end of the drum 14 to the lower end.

Charging the drum 14 with waste material from the upper end of the drum rather than from the lower end assists greatly in overcoming the tendency of the material in the drum to become stagnant at the point of discharge from the conveyor. If the conveyor enters through the lower end of the drum, the trajectory of the waste material being discharged from the conveyor sends the material further up the drum. At the same time, the cross-sectional area of the infeed conveyor itself constricts the cross-sectional area of the drum and, in a drum having substantially a constant cross-section, causes higher air velocities in the open lower portion of the drum surrounding the conveyor. The stagnant particles are those which are relatively heavy and would tend to move down the drum, yet the increased air velocity around the conveyor in the lower end prevents them from doing so. On the other hand, the relatively lower velocity of air in the upper end is insufficient to move the particles upstream. Accordingly, these particles stagnate, i.e., tend to stay in the area of the discharge point of the conveyor, and eventually these stagnant materials clog the drum.

This lack of longitudinal movement on the part of these particles is substantially eliminated when the infeed conveyor enters the drum through its upper end. Further, by shaping the inside of the drum so that the surface proceeds from a given cross-sectional area at the lower end through a generally decreasing cross-sectional area to a smaller cross-sectional area at the upper end of the drum, the lineal velocity of the air through such shape gradually increases an air flows longitudinally toward the upper end of the drum. As illustrated herein, this shape is a taper, and any type of taper or other shape that produces an ever-increasing air velocity toward the light fraction end of the drum is suitable.

It will be noted in FIG. 1 that such taper at the heavy fraction end of the drum is continuous to a point where a right sectional plane taken through the drum includes the inward end of the infeed conveyor 36. At this point there is a stepped interface 52 between the tapers of the heavy fraction end and the light fraction end where the cross-sectional area of the inside of the drum is increased. From this stepped interface, the drum tapers continuously to the upper end of the drum. This step increases the inner cross-sectional area of the drum by an amount equal to that of the conveyor 36 to compensate for the area of the air stream blocked by the conveyor, achieving the effect of a gradually decreasing cross-sectional area upwardly through the open area of the drum and a consequent gradually increasing air velocity therethrough.

An alternative form of this inside taper is seen in FIg. 3, where in drum 14a the taper is continuous from the lower end of the drum to the upper end. in such instance, at the point where the infeed conveyor 36 constricts a portion of the inner cross-sectional area of the drum, there is a stepped increase in the air velocity in the area surrounding this portion of the infeed conveyor.

The increasing air velocity, particularly at the point of discharge of conveyor 36 in the drum, is effective in substantially eliminating the tendency of materials to stagnate at this point in the drum, and the ever-increasing air velocity longitudinally of the drum is effective in carrying a particle, once it is airborne, longitudinally toward the upper end of the drum.

Referring once again to FIG. 1, the housing 38 and the conveyor 36 are suitably mounted in a cantilever fashion through the upper end of the drum to charge the rotating drum 14 with the incoming refuse. Because of the trajectory of the discharged material, it falls to a point down the drum from the end conveyor.

It is desirable to separate this incoming refuse into a light fraction comprising low bulk density materials and a heavy fraction comprising high bulk density materials. The incoming solid waste material, however, is an entanglement of the low bulk density materials and the high bulk density materials. During the trajectory and the subsequent impacts of particles with the sides of the drum, the low bulk density materials begin to disentangle themselves from the high bulk density materials. As they do so, the low bulk density materials are caught in the air stream and transported toward the upper end of the drum by virtue of their area to mass ratio and aerodynamic shape. Glass bottles generally move with the heavy fraction materials and during tumbling become broken into fragments generally not exceeding approximately one-half inch in size. Thus, as these glass fragments move down the drum 14, they fall through the trommel 42 and will not exit at the lower end of the drum with the remainder of the heavy fraction. This separation of glass particles from the heavy fraction is significant, because it leaves the heavy fraction relatively free of glass and it provides a glass-rich aggregate ready for a further glass reclamation step. Likewise, in the light fraction end, the fines of glass which otherwise are included in the light fraction in instances when the incoming refuse has been initially shredded, is not so included in accordance with this invention. Thus, by passing the light fraction under a magnetic conveyor (not shown) the ferrous content will be extracted, leaving a relatively clean light fraction that is ready to be composted or to be used as fuel that has a relatively high heating value and a relatively low ash content. If the incoming waste material has a significant content of aluminum materials, such as cans, foil, etc., the light fraction is desirably pyrolyzed to produce a heating gas and a residue which can be sifted to separate out the aluminum material from the ash. Alternatively, the light fraction can be pyrolyzed in the state in which it is collected directly out of the drum and then the residue sifted to separate out all metal materials, the ferrous and aluminum materials being then separated as a further step, if desired. Also, the light fraction can be shredded either in its state as it is collected directly out of the drum or after it has had the ferrous content removed, as appropriate.

Several elements of the illustrated apparatus cooperate to tumble the incoming material by first lifting it and then allowing it to fall through the flowing air stream. Assisting in separating the mixed solid materials into the constituent fractions are piercing elements such as spikes 54 peripherally attached on certain of the panels 50 and inwardly directed as seen in FIGS. 5 and 7. These are provided to open any bagged and otherwise wrapped material that is included in the solid waste input to expose the contents to the tumbling in the air stream. In the illustrated embodiment, it will be noted in FIG. 5 that these spikes are provided on every other of the panels 50.

On the alternate panels, as best seen in FIGS. 7 and 8, are provided a plurality of lifter shelves 56 that are peripheraly attached and inwardly directed. These lifter shelves are located toward the lower section of the drum 14 (FIG. 1) in various positions and angles as indicated to effectively cooperate with the panels 50 in lifting the waste material and tumbling the material in substantially a continuous curtain in the air stream.

This cooperatioon is best explained by referring to FIG. 9. Two adjacent panels 50 and 50a of the internal polygonal inside cross section of the drum 14 are shown along with two representative lifter shelves 56 and 56a. Lifter shelf 56 is mounted at right angles to the panel in a plane that includes the center line of the panel and the axis of rotation of the drum 14, illustrated by reference number 57. It will be appreciated that when the panel 50 is in a horizontal position under the axis 57, the side 50a as well as the lifter shelves 56 and 56a present a projected lifting face to the refuse as the panel 50 rotates counterclockwise through its horizontal position. Compared to the shelf 56, the shelf 56a and the panel 50a are both backwardly inclined with respect to radial planes 57a extending to the shelves from the axis 57. Thus, particles on these three respective elements will slide off at different rotational positions of the drum. Particles on side 50a will slide off earlier than the particles on shelf 56a, and particles on shelf 56a will slide off earlier than the particles on shelf 56. As illustrated, the shelf 56a is in the same angular position with respect to the horizontal as the shelf 56, i.e., angle $b$ is equal to angle $c$, but the shelf 56 is in an advanced position rotatively. Thus, particles on shelf 56 will slide off at a position closer to the overhead horizontal position of the panel 50 than the particles on the shelf 56a even though both shelves are mounted at right angles to the panel 50. The lateral position of the shelf 56a with respect to the center of the panel 50 provides a different effective angle with respect to the axis 57. From this it can be seen that many variations can be made to achieve a continuing curtain of dropping material in planes not parallel to the axis of the drum, thus allowing a light particle dislodged from the curtain to move upwardly without frequent collisions with other light particles. The lifting shelves are staggered longitudinally as seen in FIG. 8 and they are set at varying angles with respect to the panels on which they are mounted as well as varying their lateral positions on the panels as shown in FIG. 7. Moreover, selected lifter shelves include lips, such as seen at 58 in FIG. 7.

It has been found that the polygonal cross-sectional interior is adequate in itself to tumble the light fraction materials. As seen in FIG. 1, the lifter shelves are located in the drum below the discharge point of the infeed conveyor 36 to tumble the incoming materials. Alternatively, at least portions of all lifter faces, including the panels 50, could be coated or otherwise suitably roughened to increase their lifting effectiveness.

The degree of separation of the particles of the waste material is related to the number of times that the material falls in the drum. A typical light (low bulk density) particle is not lifted many times en route to the light fraction end of the drum unless it is intertwined with a heavy (high bulk density) particle, in which case it may be lifted and dropped a number of times before being free to be airborne and carried by the air stream to the light fraction end. Heavy particles, i.e., those that are relatively unaffected by the air velocity because of their area to mass ratio and their aerodynamic shape, on the other hand, move down the drum at a relatively predeterminable rate. Generally, each time such a particle is lifted and falls, it advances down the drum by an amount approximately equal to the diameter of the drum times the sine of the drum's angle of inclination. Thus, for example, if a drum has an internal diameter of 20 feet and an angle of inclination of 5°, a heavy particle will move down the drum 20 × 0.087 or 1.74 feet each time it is dropped from top dead center of the drum. The number of times a heavy particle is dropped is also related to the length of the drum 14 from the end of the trajectory after discharge of materials from the infeed conveyor 36. As mentioned previously, however, the inside panels 50 are related to one another as sides of a polygon, and particles falling on the flat surface of a shelf will slide on the surface down the drum as the surface moves out of the horizontal position. Accordingly, travel down the drum of the heavy particles is also affected by this interior shape and should be considered in determining a sufficient number of falls and the length of the drum to effect a desired degree of separation of low bulk density materials from the high bulk density materials.

The angle of inclination of the drum 14 is determined by several factors. From the foregoing it can be seen that the smaller the angle of inclination of the drum, the longer the heavy particles will remain in a drum of given length, which increases the weight of material in the drum at any given time and requires more power to rotate it. On the other hand, for a given angle of inclination and drum diameter, added length increases the number of times that the material falls with a consequent increase in degree of separation of the particles. It will be understood, therefore, that at higher angles of inclination, for the same drum diameter, it would be necessary to provide a longer drum in order to insure a sufficient number of falls of the heavy material for the same degree of separation of light and heavy particles. Conversely, it can be seen that at lower angles of inclination for a given drum diameter, the length of the drum could be reduced.

Another factor influencing the angle of inclination of the drum is that of air velocity. It can be shown from a free body analysis of forces acting on a falling particle that a greater air velocity is required to move a particle in a vertical direction than in a horizontal direction. Thus, at lower angles of inclination, less velocity and therefore less fan power are required than at higher angles. On the other hand, there is a minimum practical angle of inclination, because at the low air velocities that should be used at low angles of inclination, any uncertainty in these low air velocities could cause a substantial shift in the constituent percent of separation of the incoming material. Such uncertainty, for example, could be caused by unpredictable winds and by variations in system pressures.

All of these factors are important in selecting the dimensions of the drum, the angle of inclination of the drum, and the air capacity of the system. Other factors also influence air capacity. For a given angle of inclination, the greater the air velocity, the greater the percentage of the incoming materials that will be separated into the light fraction.

It is desirable to separate the incoming materials into a light fraction that comprises at least 50 percent by weight of the incoming material. In accordance with the invention, the light fraction comprises approximately 70 percent by weight of the incoming material.

Thus, the heavy fraction contains approximately 30 percent by weight of the incoming material. However, because of the relative density of the heavy fraction, it comprises less than about 10 percent by volume of the incoming material and the light fraction comprises approximately 90 percent. It is, therefore, understandable that the heavy fraction materials are run on a conveyor past an inspection station after being cleaned of the light bulky fraction where an inspector can easily detect oversized and unwanted objects, such as truck engines, transmissions, dead animals, and explosives.

In accordance with the invention, the angle of inclination of the drum 14 is between 2° and 12°, and preferably between about 5° and about 7.5°. At an angle of 5°, an air velocity of about 900 feet per minute in a drum that has an average internal diameter of 20 feet and a length of about 30 feet is effective to produce a separation of about 70 percent by weight of light fraction and about 30 percent by weight heavy fraction. This is a length to internal diameter ratio in the drum of 1.5. The input rate of the waste material under those conditions is approximately 140 tons per hour. The infeed conveyor 36 extends through the upper end of the drum for approximately one-third the length of the drum. Thus, the heavy fraction tumbles in approximately two-thirds the length of the drum. This insures a sufficient number of falls to obtain the desired separation.

It will be understood that a continuous curtain of material falling in the air stream provides high resistance to the flow of air. Therefore, the blower 32 must have the capability of providing an air velocity through the drum of 900 lineal feet per minute while overcoming the resistance of the system. Preferably, the blower will have the capability of establishing a differential pressure of about 8 inches of water. The blower capacity in the illustrated embodiment for these conditions is approximately 285,000 cubic feet per minute and is driven by a motor 34 having at least a rating of 850 horsepower.

By comparison, to produce the same percentage separation where the angle of inclination is 7.5° and the average internal diameter of the drum is 20 feet, the length of the drum is approximately 42 feet and accepts an infeed of refuse material of approximately 170 tons per hour and requires approximately 1100 feet per minute air velocity through the drum. The blower capacity under these latter conditions is approximately 347,000 cubic feet per minute at approximately 1,000 horsepower.

In each instance, the speed of the drum rotation is between about 10 and about 12 rpm.

As mentioned previously, the invention substantially reduces the tendency of material to stagnate and clog the drum. In this connection, the portions of the infeed conveyor 36 and its housing 38 that extend into the drum 14 from its upper end are enclosed with a cylinder 60 that is free to rotate about the longitudinal axis of the conveyor. Rather than material falling and collecting on the top of the housing and eventually clogging the system, the material falls instead on the top of the cylinder. As the material builds up it eventually is hit by a portion of the rotating polygonal surface causing the cylinder to rotate and drop the collected material back into the drum. Alternatively, the cylinder could be power driven or continuous rotation. A baffle member 61 having a circular perimeter substantially formed to the inner surface of the cylinder 60 and formed to fit and be mounted around the housing 38 is provided to block the air flow through the cylinder 60 and insure that airborne particles move in the air stream in the open area around the cylinder and out the upper end of the drum 14. Reference was made earlier to the instance of the stepped taper construction of the drum as shown in FIG. 1 wherein the cross-sectional area is increased by an amount equivalent to or less than the cross-sectional area of the conveyor 36 and housing 38. For this purpose, the cylinder 60 and baffle member 61 are considered part of this assembly and the cross-sectional area of the drum is increased accordingly.

In addition to the gradually increasing air velocity through the drum being used to overcome stagnation, it is also in accordance with the invention to provide variable speed means, such as a variable speed reducer 62 driven by a motor 64, to power the infeed conveyor 36. Thus, the speeds of both the cross conveyor 43 and the infeed conveyor 36 preferably are variable to control the charging rate of the refuse into the rotating drum 14.

Furthermore, as seen in FIG. 10, it is contemplated within the invention to add a shunt path 66 to intercept all or at least a portion of the air being exhausted from the plenum 28 and return such air to the input of the rotating drum 14 at its lower end for recirculation through the drum. For this, a plenum 67 is added to intercept the exhaust from the plenum 28, and control means, such as shutters 68, are provided on the output of the plenum 67 to control the amount of air that is exhausted to the atmosphere through the shutters and into the bypass 66 for recirculation through the drum. It has been found that such a shunt system is effective for increasing the air velocity through the system without requiring increased blower capacity, or in the alternative, to provide a constant air velocity through such a system at a lower blower capacity.

Accordingly, an additional method of overcoming stagnation is to charge the drum 14 with incoming material at a higher than normal rate for a period of time, preferably 2 minutes, and then to stop the infeed completely for another period of time, preferably 1 minute. During the high rate of infeed, the usual air velocity is provided through the drum. While the infeed is stopped or substantially decreased in rate, however, the air velocity through the system is increased, preferably from about 5 to about 20 percent. This causes stagnated material in the drum to move to the light fraction end. This procedure also has the effect of somewhat increasing the overall percentage of material that is separated as the light fraction. Such pulsation of air flow in conjunction with varying the rate of infeed can be utilized as the need arises or set to operate in regular cycles. Alternatively the pulsation of air flow may be used with no change in rate of infeed to substantially reduce stagnation in the drum.

Further, the variable speed reducer 18 (FIG. 1) may be used to vary the speed of rotation of the drum 14, and this is effective in unclogging or preventing clogging of the drum 14. Varying the rotational speed of the drum also may be used in conjunction with the aforementioned air velocity pulsation and/or in conjunction with varying the rate of refuse infeed as circumstances may direct in processing large volumes of refuse or other matter.

In connection with the speed of rotation of the drum 14, it will be remembered that the invention advantageously processes the refuse in a previously unshredded condition, and that such material may contain dynamite or other explosives. It is known that explosions can and do regularly occur in plants which shred incoming solid waste as a first step. Dust and vapor explosions in such shredding plants are believed to be initiated by sparks produced when a high speed (typically 200 feet per second) hammer strikes glass or other spark-producing object. Based on available information, an impact of approximately 50 feet per second directly on dynamite will initiate an explosion. Such is true of some military ordnance whether or not it is fused or armed. Accordingly, if dynamite is processed through a hammer mill, an explosion is likely.

By contrast, the lifters of the rotating drum 14 of this invention have a velocity of about 20 feet per second or less. Such velocity is highly unlikely to initiate a dynamite explosion, and the dynamite and military ordnance will exit at the heavy fraction end of the rotating drum after being cleaned of the highly bulky light fraction. Here the explosives can be easily detected by an inspector before the heavy fraction is further processed.

Thus, there has been provided in accordance with this invention a method and apparatus for separating solid materials that have not previously been through a size reduction process into a low bulk density light fraction and a high bulk density heavy fraction that includes charging the materials directly into an inclined rotating air drum processor at a position intermediate the ends of the processor. When the solid materials is refuse, such as urban waste, the light fraction is substantially combustible and the heavy fraction is substantially incombustible. Means are provided for lifting and dropping the materials within the rotating drum processor. Air is caused to flow through the rotating drum at a predetermind velocity to separate at least 50 percent by weight of the materials by virtue of their area to mass ratio and aerodynamic shape as the light fraction at one end of the drum. The drum has an internal diameter and a length, particularly between the receiving position of the charged material in the drum and its lower end, adequate to insure that the refuse undergoes a sufficient number of lifting and dropping actions during the travel of the heavy materials to the lower end of the drum for discharge as the heavy fraction to provide the desired separation. Means also are provided for controlling the velocity of the air and the rotational velocity of the drum and the charging flow of the refuse as well as providing an ever-increasing air velocity through the drum to effect the desired separation and to prevent a substantial stagnation of material in the rotating drum processor. Means also are provided for separating out of the heavy fraction a smaller sized glass-rich fraction.

The light fraction is substantially glass-free, and passing the light fraction under an overhead magnetic separator to remove ferrous materials, the light fraction can be shredded by light duty apparatus, or be composted, or be utilized as fuel having a relatively high heating value and a relatively low ash content. Alternatively, the light fraction is pyrolyzed, with or without first removing magnetic materials, to produce a heating gas and residue which can be sifted to separate out the metal materials. The heavy fraction likewise can be shredded if desired after inspection to detect unwanted objects, because it also is substantially free of glass, which causes severe erosion of shredder parts. Further, a glass-rich fraction is available from the processor for reclaiming glass.

While the invention has been described generally in connection with a preferred embodiment, alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A method of processing refuse and separating its constituent materials into a low bulk density substantially combustible light fraction and a high bulk density substantially incombustible heavy fraction comprising the steps of: charging the refuse directly into an inclined rotating air drum processor at a position intermediate the ends thereof without a previous size reduction of the refuse; lifting and dropping the refuse within said drum processor to expose the refuse materials to air separation; rotating said air drum processor to cause the heavy fraction materials in said refuse to undergo a sufficient number of lifting and dropping actions during their travel to the lower end of said drum for discharge as the heavy fraction to effect disentanglement of light fraction materials from the heavy fraction materials; flowing air through the rotating drum at a velocity to separate at least 50 percent by weight of the refuse materials by virtue of their area to mass ratio and aerodynamic shape as the light fraction at one end of said drum, and controlling the air velocity to provide an ever increasing air velocity in the upwardly inclined direction and controlling the rotational velocity of said drum and the charging flow of the refuse to prevent a substantial stagnation of material in said air drum processor.

2. A method of processing refuse in accordance with claim 1 including the step of breaking open refuse and garbage bags within said processor to expose the contents of the bags to air separation.

3. A method of processing refuse in accordance with claim 1 including the step of screening by size the heavy fraction to separate a smaller size glass-rich fraction from the remainder of the heavy fraction.

4. A method of processing refuse in accordance with claim 1 including the step of dropping said refuse within said drum and impacting said refuse at velocities substantially below an impact velocity which detonates dynamite.

5. A method of processing refuse in accordance with claim 1 including the steps of charging refuse at the rate of at least 50 tons per hour into said air drum processor and providing an air velocity of at least about 900 feet per minute through said air drum processor.

6. A method of processing refuse in accordance with claim 1 in which the step of charging the refuse further comprises conveying the material to a position located internally of said rotating air drum processor and located substantially longitudinally upwardly of the longitudinal middle of said rotating air drum processor.

7. A method of processing refuse in accordance with claim 1 including the additional step of shredding said light fraction after removal thereof from said air drum processor.

8. A method of processing refuse in accordance with claim 7 including the step of removing magnetic materials from the light fraction by magnetic attraction prior to shredding said light fraction.

9. A method of processing refuse in accordance with claim 1 including the additional steps of pyrolyzing said light fraction after removal thereof from said air drum processor and then sifting the residue to reclaim metallic materials in the light fraction.

10. A method of processing refuse in accordance with claim 1 including the steps of removing magnetic materials from the light fraction by magnetic attraction after removal of the light fraction from said air drum processor, pyrolyzing the light fraction and then sifting the residue to reclaim aluminum materials in the light fraction.

11. A method in accordance with claim 3 wherein the heavy fraction from which the glass has been substantially removed is further processed by the step of size reducing this fraction after removal thereof from said air drum processor.

12. A method of processing refuse and separating its constituent materials into a low bulk density substantially combustible light fraction and a high bulk density substantially incombustible heavy fraction comprising the steps of: charging the refuse directly into an inclined rotating air drum processor at a rate of at least 50 tons per hour at a position intermediate the ends thereof without a previous size reduction of the refuse; lifting and dropping the refuse within said drum processor to expose the refuse materials to air separation; rotating said drum to cause the heavy fraction material in said refuse to undergo a sufficient number of lifting and dropping actions during their travel to the lower end of said drum for discharge as the heavy fraction to effect disentanglement of light fraction materials from the heavy fraction materials; inducing air flow through said rotating drum air processor at the charging location to separate at least 50 percent by weight of the charged refuse materials by virtue of their area to mass ratio and aerodynamic shape as the light fraction at the upper end of said drum, and controlling the air flow to provide an ever increasing air velocity in the upwardly inclined direction to prevent stagnation of material having a critical velocity close to the velocity of air flow through said air drum processor.

13. A method of processing refuse in accordance with claim 12 including the step of screening by size the heavy fraction to separate a smaller size glass-rich fraction from the remainder of the heavy fraction.

14. A method of processing refuse in accordance with claim 12 in which the step of controlling air flow comprises providing a decreasing air force to travel of refuse materials in a downwardly direction toward the heavy fraction end of said air drum processor and providing an increasing air force to travel of refuse materials in an upwardly direction toward the light fraction end of said air drum processor.

15. A method of processing refuse in accordance with claim 14 in which the step of controlling air flow comprises an additional step of pulsating the air flow through said air drum processor.

16. A method of processing refuse in accordance with claim 12 in which the step of controlling air flow comprises an additional step of pulsating the air flow through said air drum processor.

17. A method of processing refuse and separating its constituent materials into a low bulk density substantially glass-free fraction and into a high bulk density heavy fraction having a substantially reduced glass content comprising the steps of charging the refuse materials directly into an inclined rotating air drum processor at a position intermediate the ends thereof without a previous size reduction of the refuse materials, lifting and dropping the refuse within said air drum processor to separate the heavy and light fractions, inducing air flow through said rotating air drum processor at velocity to separate the charged refuse materials by virtue of their area to mass ratio and aerodynamic shape as the light fraction being relatively free of glass at the upper end of said drum, rotating said drum and screening by size the heavy fraction to separate a smaller size glass-rich fraction from the remainder of the heavy fraction, and discharging the remaining heavy fraction and discharging the light substantially glass-free fraction.

18. A method of processing refuse and separating its constituent materials into a substantially metal-free low bulk density light fraction and a high bulk density heavy fraction comprising the steps of: charging the refuse directly into an inclined rotating air drum processor at a position intermediate the ends thereof without a previous size reduction of the refuse; lifting and dropping the refuse within said drum processor to expose the refuse materials to air separation; rotating said drum to cause the heavy fraction materials in said refuse to undergo a sufficient number of lifting and dropping actions during their travel to the lower end of said drum for discharge as the heavy fraction to effect disentanglement of light fraction materials from the heavy fraction materials; flowing air through the rotating drum; and controlling the air flow through said rotating drum air processor to provide an ever increasing air velocity for the drum air processor in the upwardly inclined direction to separate the higher bulk density metallic materials of the charged refuse by virtue of their area to mass ratio and aerodynamic shape from the lower bulk density generally non-metallic materials to provide a relatively metal-free low bulk density fraction for discharge at the upper end of said drum.

* * * * *